United States Patent
Gregerson

(10) Patent No.: US 10,744,441 B2
(45) Date of Patent: Aug. 18, 2020

(54) AIR FILTER WITH SPIRAL-WRAPPED FRAME

(71) Applicant: 3M INNOVATIVE PROPERTIES COMPANY, St. Paul, MN (US)

(72) Inventor: Glen O. Gregerson, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 196 days.

(21) Appl. No.: 16/078,487

(22) PCT Filed: Mar. 27, 2017

(86) PCT No.: PCT/US2017/024245
§ 371 (c)(1),
(2) Date: Aug. 21, 2018

(87) PCT Pub. No.: WO2017/176480
PCT Pub. Date: Oct. 12, 2017

(65) Prior Publication Data
US 2019/0046910 A1 Feb. 14, 2019

Related U.S. Application Data

(60) Provisional application No. 62/317,972, filed on Apr. 4, 2016.

(51) Int. Cl.
| | |
|---|---|
| *B01D 46/00* | (2006.01) |
| *B01D 46/10* | (2006.01) |
| *B01D 46/52* | (2006.01) |
| *B01D 39/00* | (2006.01) |

(52) U.S. Cl.
CPC ......... *B01D 46/0016* (2013.01); *B01D 39/00* (2013.01); *B01D 46/009* (2013.01); *B01D 46/10* (2013.01); *B01D 46/521* (2013.01); *B01D 2275/205* (2013.01); *B01D 2279/50* (2013.01)

(58) Field of Classification Search
CPC .. B01D 46/0016; B01D 46/10; B01D 46/521; B01D 2275/205; B01D 46/009; B01D 2279/50
See application file for complete search history.

(56) References Cited

U.S. PATENT DOCUMENTS

| | | | | |
|---|---|---|---|---|
| 3,970,440 A | * | 7/1976 | Copenhefer | B01D 46/10 55/501 |
| 4,086,071 A | * | 4/1978 | Champlin | B01D 46/10 55/501 |

(Continued)

FOREIGN PATENT DOCUMENTS

| | | |
|---|---|---|
| CA | 2778709 | 12/2012 |
| CA | 2830272 | 4/2014 |

(Continued)

OTHER PUBLICATIONS

International Search Report for PCT International Application No. PCT/US2017/024245, dated Jun. 30, 2017, 3 pages.

*Primary Examiner* — Robert Clemente
(74) *Attorney, Agent, or Firm* — Kenneth B. Wood

(57) ABSTRACT

A framed air filter in which at least one portion of the frame is provided by a spiral-wrapped frame piece in which a terminal segment of the spiral-wrapped frame piece serves as a reinforcing strut.

20 Claims, 7 Drawing Sheets

(56) References Cited

U.S. PATENT DOCUMENTS

| | | | | |
|---|---|---|---|---|
| 4,372,763 A | * | 2/1983 | Champlin | B01D 46/0016 55/501 |
| 4,561,587 A | * | 12/1985 | Wysocki | B01D 46/0002 210/232 |
| 4,570,844 A | * | 2/1986 | Wysocki | B65D 5/2009 229/100 |
| 5,476,526 A | | 12/1995 | Attermeyer | |
| 5,531,892 A | | 7/1996 | Duffy | |
| 5,782,944 A | | 7/1998 | Justice | |
| 6,126,707 A | * | 10/2000 | Pitzen | B01D 46/0005 428/122 |
| 6,866,153 B2 | | 3/2005 | Turner, Jr. | |
| 7,537,632 B2 | * | 5/2009 | Miller | B01D 46/0002 55/495 |
| 2004/0148915 A1 | * | 8/2004 | Lipner | B01D 46/0002 55/495 |
| 2007/0204574 A1 | * | 9/2007 | Workman | B01D 46/10 55/495 |
| 2007/0289273 A1 | | 12/2007 | Boyd | |
| 2007/0294988 A1 | | 12/2007 | Miller | |
| 2009/0183477 A1 | | 7/2009 | Workman | |
| 2010/0269467 A1 | * | 10/2010 | Crabtree | B01D 46/10 55/499 |
| 2013/0327004 A1 | | 12/2013 | Lise | |
| 2019/0242616 A1 | * | 8/2019 | Gregerson | B01D 46/10 |

FOREIGN PATENT DOCUMENTS

| | | |
|---|---|---|
| GB | 1439831 | 6/1976 |
| MX | 2010004593 | 10/2010 |
| WO | WO 2000-51710 | 9/2000 |
| WO | WO 2011-088185 | 7/2011 |

* cited by examiner

AIR FILTER WITH SPIRAL-WRAPPED FRAME

BACKGROUND

Framed air filters are often used in air-handling systems, e.g. heating and air conditioning systems, room air purifiers and the like, in order to remove airborne particles such as e.g. dust, dirt, and pollen.

SUMMARY

In broad summary, herein is disclosed a framed air filter in which at least one portion of the frame comprises a single, spiral-wrapped frame piece in which a terminal segment of the spiral-wrapped frame piece serves as a reinforcing strut. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Glossary

The term front denotes the side of a frame to which filter media is attached (as seen e.g. in FIG. 3); the term rear denotes the opposing side, as discussed in detail herein. The front-rear axis of the frame will generally correspond to the upstream-downstream axis of airflow through the framed filter, although the air may flow in either direction along this axis, as noted later.

References to outward and inward refer to laterally outward and inward directions unless otherwise specified. The term lateral is defined with respect to a framed filter as a whole, and refers to directions aligned with the major plane of the framed filter. Laterally inward refers to directions toward the geometric center of the framed filter (i.e., toward the center of the active filtration area of the framed filter); laterally outward refers to directions away from the geometric center of the framed filter.

The terms spirally-inward and spirally-outward are defined with respect to a particular frame portion. Spirally-inward denotes a direction toward an interior space that is formed when a frame piece is spiral-wrapped to form the frame portion; spirally-outward denotes a direction outward away from the interior space.

By spiral-wrapped is meant that a frame portion is provided by wrapping foldably-connected segments of a single frame piece so that a terminal segment of the frame piece is positioned within an interior space formed by other segments of the frame piece, as discussed in detail later herein. By definition, a spiral-wrapped frame portion does not encompass a frame portion that incorporates segments from two or more separately-provided frame pieces, although ancillary components (such as e.g. corner tabs) that extend from a separate frame piece may extend e.g. into a terminal end of a frame portion without violating the condition that the frame portion is spiral-wrapped.

By foldably-connected is meant that two segments of a frame piece are connected to each other along a fold line (provided by a line of weakness, e.g. a score line), which fold line allows the two segments to be folded relative to each other along the fold line while allowing each segment to remain at least generally planar.

Figure 4:
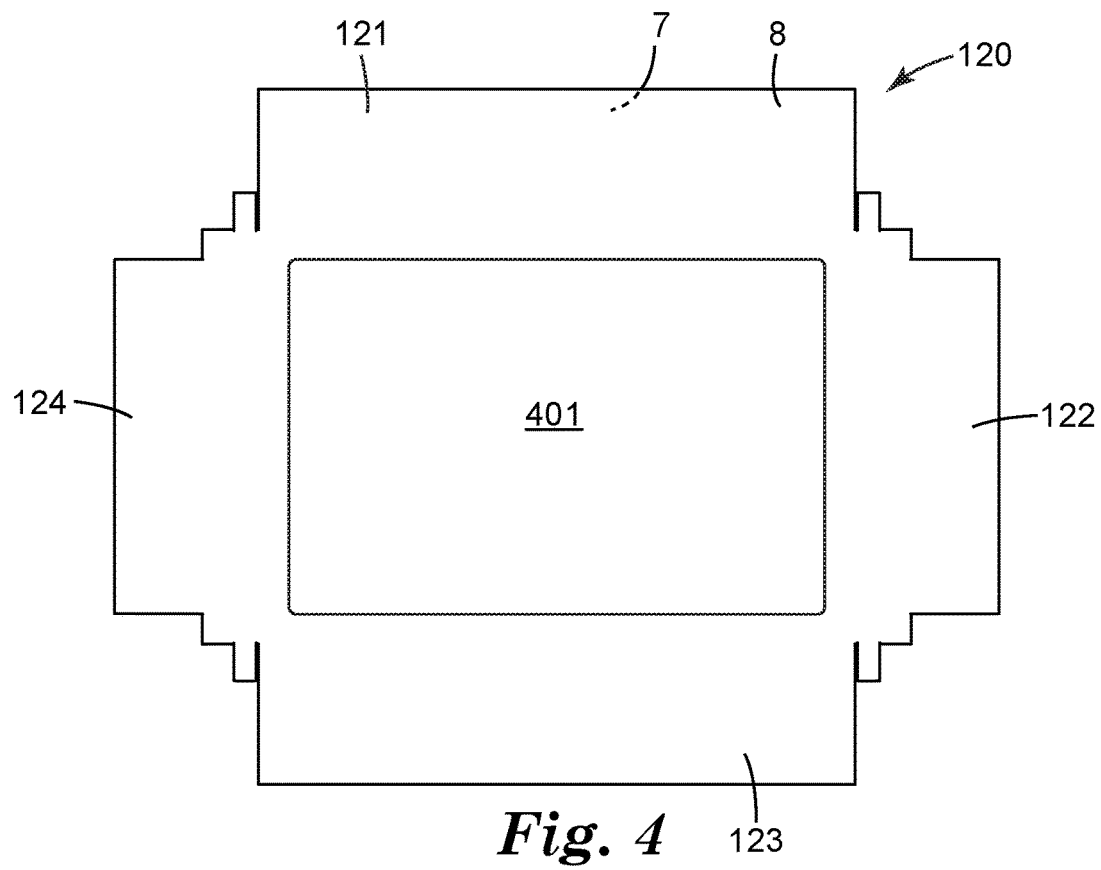
FIG. 4 is a plan view of an exemplary frame part in a flat state.
Figure 5:
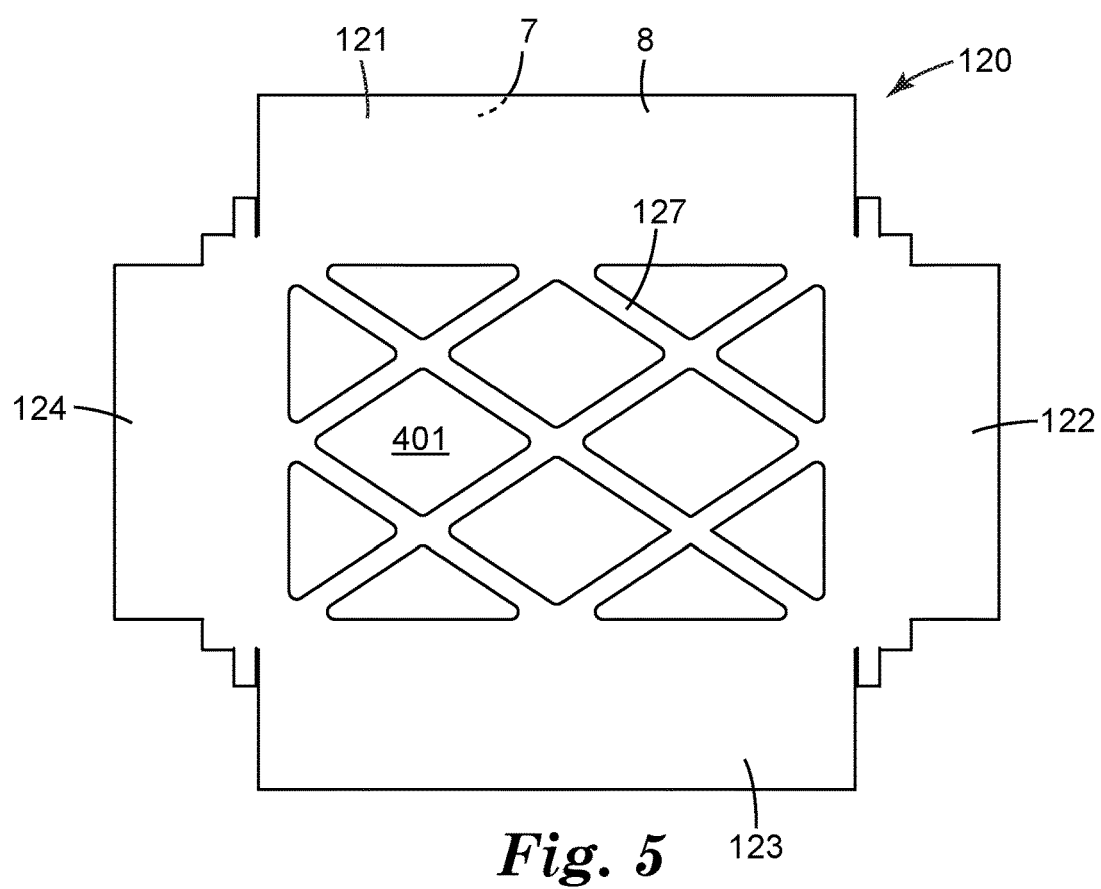
FIG. 5 is a plan view of another exemplary frame part in a flat state.
Figure 9:
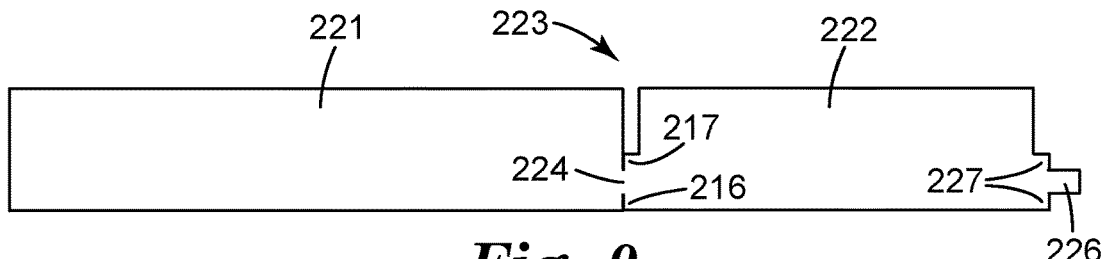
FIG. 9 is a plan view of another exemplary frame part in a flat state.

By a frame portion is meant an elongate section of a filter frame, which section extends along one of the four major sides of the frame. By a frame piece is meant a flat, elongate entity that comprises elongate segments that are foldably connected by fold lines that extend along the elongate length of the frame piece and that can be spiral-wrapped to form a frame portion. By a frame part is meant a flat entity that includes one frame piece or that includes two or more frame pieces that are each integrally connected to at least one other frame piece of that frame part. (FIG. 4 shows a frame part 120 that is comprised of four frame pieces that are each integrally connected to two other frame pieces; FIG. 9 shows a frame part 223 that is comprised of two frame pieces that are integrally connected to each other.)

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "generally" as used herein with respect to geometric concepts (such as parallel lines and planes) and shapes (such as rectangles and triangles), allows deviations from the special case of exactly parallel lines and planes, and exactly rectangular and triangular shapes, as discussed in detail later herein.

The term "essentially" means to a high degree of approximation (e.g., within plus or minus 4% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter.

DETAILED DESCRIPTION

Figure 1:
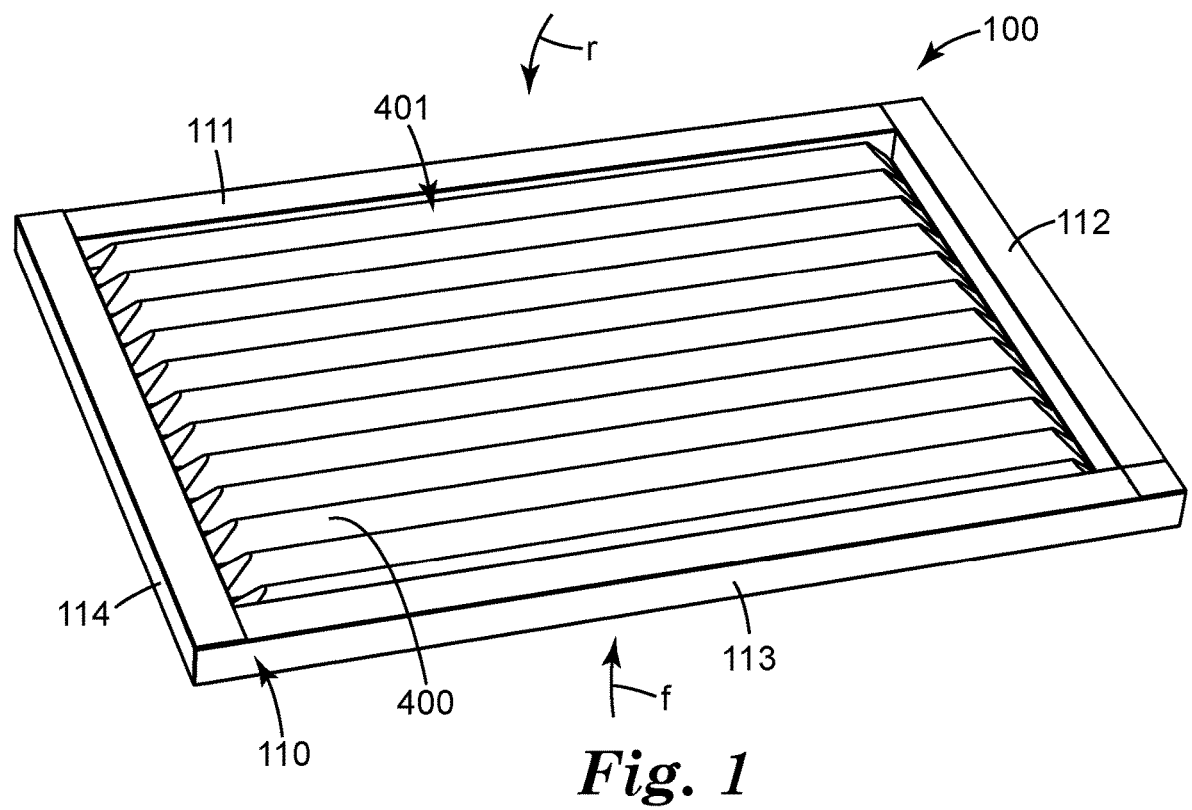
FIG. 1 is a perspective view, from the rear side, of an exemplary framed air filter in accordance with principles of the present disclosure.

Shown in FIG. 1 in perspective view from the rear side is an exemplary framed air filter 100. As noted in the Glossary, the front of a framed filter (and components thereof, such as frame 110) denotes the side of the frame filter on which the filter media (specifically, the edge of the filter media that is attached to the frame) is located; the term rear denotes the opposing side. Certain figures (e.g. FIGS. 1 and 3) are marked with "f" and "r" to aid in recognition of the front and rear sides of framed air filters and components thereof as disclosed herein. However, these terms are used purely for convenience of description and do not signify any specific manner in which a framed filter must necessarily be installed in an air handling system. That is, any such filter may be installed in an air handling system (e.g. of a building HVAC system, of a room air purifier, and so on), with the front side, or the rear side, being an upstream side that faces the stream of incoming air.

Figure 2:
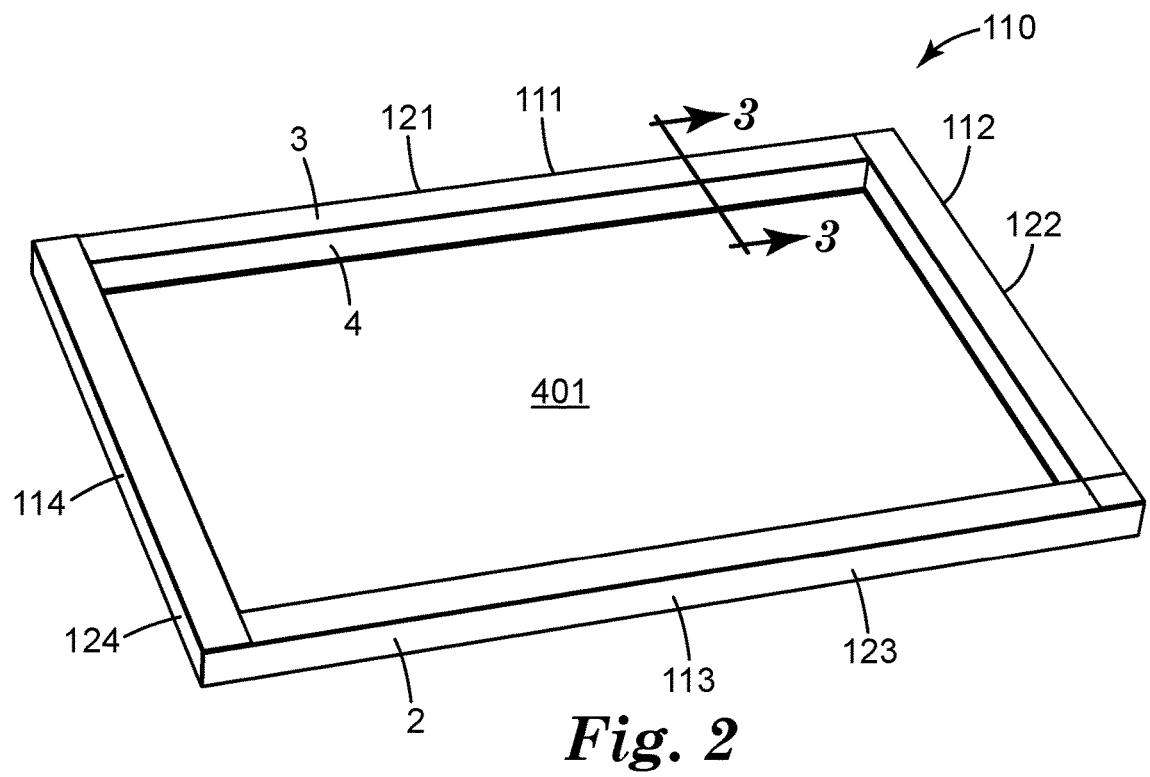
FIG. 2 is a perspective view of the frame of the exemplary framed air filter of FIG. 1, with the filter media omitted.

Framed air filter 100 includes filter media 400 (which may be any desired filter media, e.g. pleated or unpleated, monolayer or multilayer, and so on) and a perimeter frame 110. The frame 110 is mounted generally on, and surrounds, a perimeter of the filter media 400. The framed air filter 100 can be at least generally rectangular in shape (which specifically includes square shapes) having e.g. four corners. The perimeter of filter media 400 thus can have a generally rectangular shape (which does not preclude irregularities, notches, chamfered or angled corners, or the like, along the perimeter). Frame 110 may thus take the form of an at least generally rectangular frame with four frame portions 111, 112, 113, and 114 (as seen in FIGS. 1 and 2) that are each mounted on one of the four major edges of the filter media. Each frame portion is elongated along one edge of the filter media 400 and meets a neighboring frame portion at a corner of the frame; the four frame portions in combination collectively define frame 110. Each frame portion is made from a frame piece that is spiral-wrapped as described herein.

Figure 3:
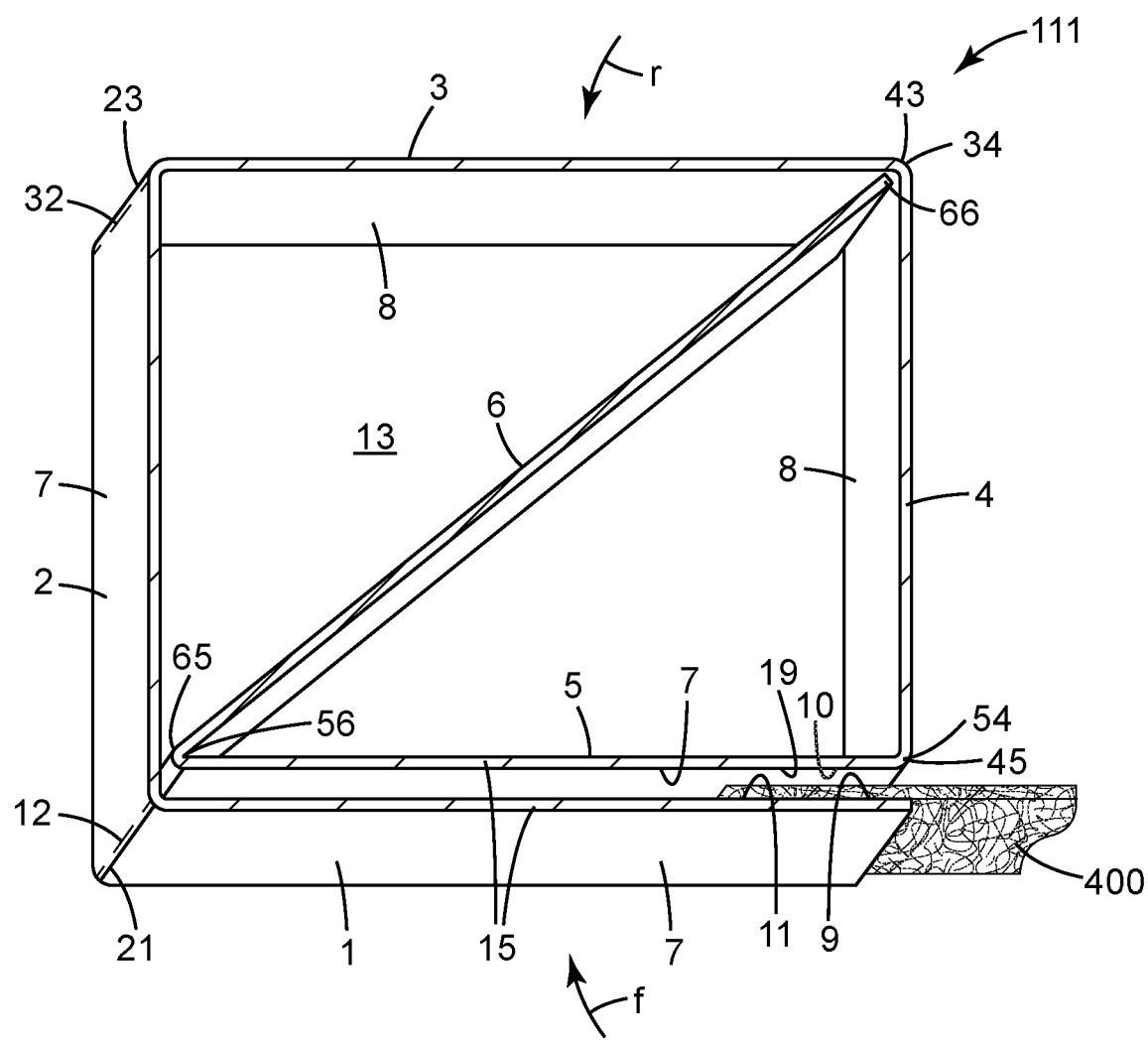
FIG. 3 is a cross-sectional view of a portion of the frame of FIG. 2, taken along line 3-3.

Each frame portion is formed from a single frame piece that comprises multiple segments that are foldably connected to each other by fold lines. By way of specific example, frame portion 111 of FIGS. 1-3 is provided by single frame piece 121 of FIGS. 4 and 6. That is, single frame piece 121, shown in a flat state in FIGS. 4 and 6, can be spiral-wrapped, by folding various segments of frame piece 121 along fold lines as discussed in detail later herein to form frame portion 111. By a frame portion being provided by a single frame piece is meant that the particular frame portion is formed from a single frame piece rather than by using (e.g., wrapping) multiple, separate frame pieces together. This does not however require that all four frame portions must necessarily be formed from the same frame part. While such an arrangement (exemplified in FIG. 4, in which individual frame pieces 121, 122, 123, and 124 are all part of a single, integral frame part 120, and respectively form portions 111, 112, 113, and 114 of the frame formed therefrom) may be convenient, in other embodiments the four frame portions may be formed from four separate frame parts (each supplying one frame piece). In other embodiments, two frame portions may be formed from a single frame part, with two other frame portions being formed from another single frame part (e.g. as discussed later herein with respect to the embodiment of FIGS. 7-9).

Figure 6:
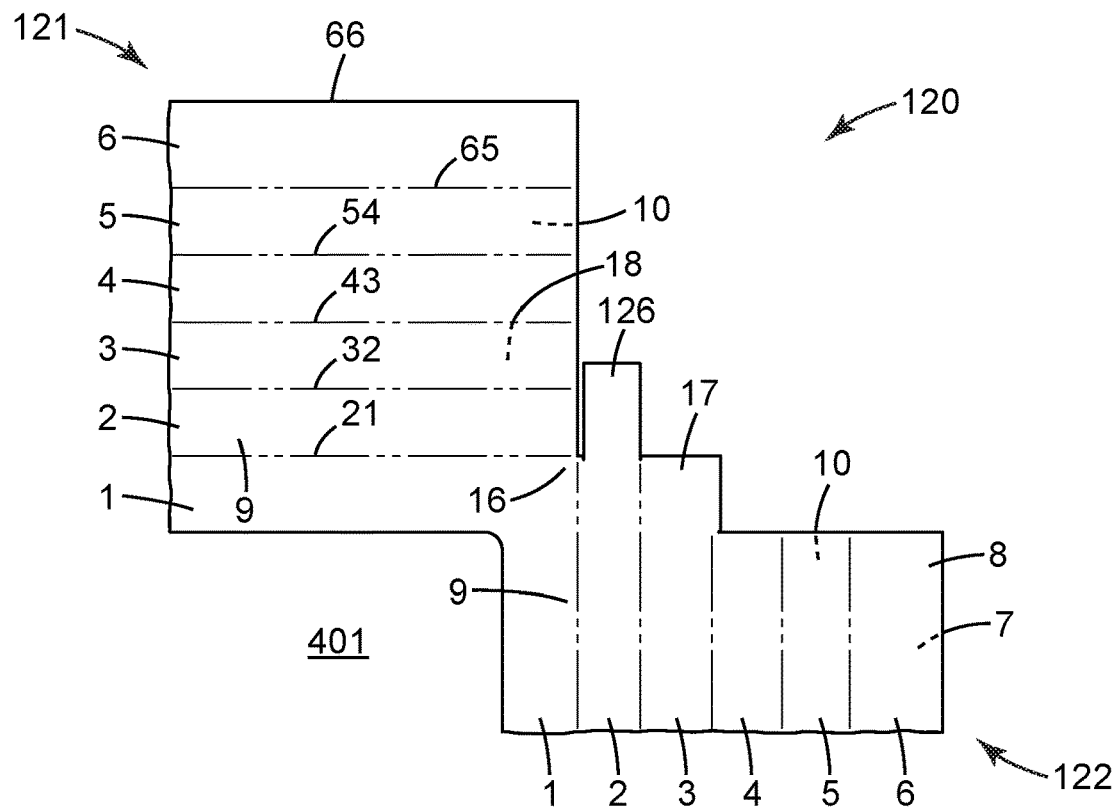
FIG. 6 is a magnified plan view of a portion of the exemplary frame part of FIG. 4.

With brief reference to FIG. 6, segments of a frame piece are foldably connected to each other by fold lines. For example, segments 1 and 2 of frame piece 121 are foldably connected to each other via fold line 21. Such fold lines are typically aligned with the elongate length of the frame piece and can extend along at least a significant extent (e.g., 80, 90, 95, 98, or 100%) of the elongate length of the frame piece so that the frame piece can be spiral-wrapped so to form a frame portion with an elongate length. Such a fold line can be achieved by any known method that provides a line of weakness along which the two segments can be folded relative to each other but with the majority of the area of each segment (except for e.g. a small portion of the area close to the fold line) remaining at least generally planar. Such fold lines can be provided e.g. by scoring, partially perforating, or using any other suitable method to provide a path along which a fold may be preferentially formed. Such score lines may be most effective if applied to the spiral-outward side of the frame piece, although they may be applied to the spirally-inward side (or to both sides) if desired. (Since FIG. 6 is a view from the spirally-inward side of the frame piece, the actual score lines that provide the fold lines may be on the opposite side of the frame piece.) It will be appreciated that an advantage of a spiral-wrapped frame is that all of the score lines may be located on the same side (e.g. the spiral-outward side) of a frame piece, which can simplify the process of making and scoring the frame piece.

As used herein, the term foldably connected as applied to any two specific segments of a frame piece denotes that the two segments are directly connected to each other. By way of specific examples, segments 1 and 2 of frame piece 121 of FIG. 6 are directly foldably connected to each other; segments 1 and 3 of frame piece 121 of FIG. 6 are not directly foldably connected to each other. (Generic references such as to e.g. "multiple segments that are foldably connected by fold lines" does not require that every single one of the segments is directly foldably connected to every other segment; rather, it merely implies that all of the segments are foldably connected to each other, whether directly by a single fold line or indirectly by two or more fold lines.) In any event, in no sense does the term foldable imply that a frame portion (or the entirety of a frame), once formed, is foldable in the sense that it can be collapsed or folded flat. In fact, as will be made clear herein, frames as disclosed herein, once formed, can exhibit enhanced structural rigidity and are typically resistant to folding or collapsing.

The disclosed spiral-wrapped frame can be made from a frame part (comprising one or more frame pieces as explained herein) that is made of any suitable material, e.g. plastic, metal and so on. In many convenient embodiments, the frame part may be made of cellulosic chipboard (paperboard), of any suitable thickness that provides sufficient mechanical rigidity but that also allows (e.g. when provided with score lines) the ability to form a foldable connection. In various embodiments, such paperboard may range from at least about 16, 18, 20, 22, or 24 thousandths of an inch in thickness, to at most about 36, 34, 32, 30, or 28 thousandths of an inch in thickness. At least one side of the paperboard may comprise a decorative coating or layer if desired.

By spiral-wrapped is meant that a single frame piece that provides a frame portion is formed into the frame portion by wrapping foldably-connected segments of the frame piece so that a terminal segment of the frame piece is positioned within an interior space formed by other segments of the frame piece. This is illustrated in exemplary embodiment in FIG. 3, which shows a cross-sectional view of frame portion 111. As illustrated, segments 1, 2, 3, 4 and 5 of a frame piece (e.g. of frame piece 121 of FIG. 6) are spiral-wrapped to form a frame portion 111 and to define (i.e., to enclose, when viewed along the elongate axis of the frame portion as in FIG. 3) an interior space 13. Terminal segment 6 of the frame piece 121 is positioned within this interior space 13.

In further detail, exemplary frame portion 111 of FIG. 3 is formed by spiral-wrapping first segment 1, second segment 2, third segment 3, fourth segment 4, fifth segment 5, and sixth segment 6, of frame piece 121 of FIG. 6. First segment 1 and second segment 2 are foldably connected (to each other) by fold line 21. Second segment 2 and third segment 3 are foldably connected by fold line 32; third segment 3 and fourth segment 4 by fold line 43; fourth segment 4 and fifth segment 5 by fold line 54, and fifth segment 5 and sixth segment 6 by fold line 65. (Sixth segment 6 being a terminal segment of the frame piece, the terminal end 66 of segment 6 is not connected (foldably or otherwise) to any other segment of frame piece 121.) The numbering of segments 1-6 thus specifies a sequential order, with segment 6 being the terminal segment that provides a reinforcing strut as described below.

As shown in exemplary embodiment in FIG. 3, these frame piece segments can be spiral-wrapped so as to define interior space 13. Furthermore, the folding can be performed so that the junction of first segment 1 and second segment 2 (along fold line 21) provides a vertex 12 (as shown on FIG. 3) that is an outward-front (both as defined in the Glossary) vertex of the frame portion. In similar manner, the junction of second segment 2 and third segment 3 provides an outward-rear vertex 23 of the frame portion; the junction of third segment 3 and fourth segment 4 provides an inward-rear vertex 34, and the junction of fourth segment 4 and fifth segment 5 provides an inward-front vertex 45. The junction of fifth segment 5 and sixth segment 6 constitutes vertex 56, and is located spirally-inward of, and closely proximate to, vertex 12 of the first and second segments (thus meeting the condition that sixth segment 6 "extends from" the outward-front vertex 12 of the frame portion). Sixth segment 6 is a terminal segment that extends from outward-front vertex 12 and terminates at inward-rear vertex 34 (with, in many cases, the terminal end 66 of segment 6 being in contact with the spirally-inward surface 8 of segment 3 or segment 4, at or very near vertex 34).

It will thus be evident that sixth segment 6, positioned in this manner, can act as a reinforcing strut that extends at least generally diagonally across interior space 13 of the frame portion. As such, sixth segment 6 can enhance the resistance of the frame portion to being crushed (e.g. by force applied along the front-rear direction of the frame portion), and can also improve the resistance of the frame portion to being twisted. In particular, when all four of the frame portions of a filter frame are each spiral-wrapped to each comprise a sixth segment that provides a reinforcing strut in this manner, the entire frame may display enhanced resistance to being bodily twisted or deformed.

A frame piece, when spiral-wrapped to form a frame portion, comprises a first major surface (surface 8 of FIGS. 3 and 6) that is a spirally-inward surface, and a second major surface (surface 7 of FIGS. 3 and 6) that is a spirally-outward surface. In at least some embodiments, a frame piece when spiral-wrapped into a frame portion, forms an at least generally rectangular shape (that is, it encloses an at least generally rectangular interior space 13, as in FIG. 3). As noted earlier, this does not require that the shape must be exactly rectangular; allowable variations are discussed below. In some embodiments, sixth segment 6 may extend at least generally diagonally across interior space 13 so as to divide the generally rectangular interior space into first and second generally triangular sub-spaces, as shown in exemplary embodiment in FIG. 3.

A "generally rectangular" interior space of a frame portion is not required to be a perfect rectangle (or square). Deviations from this are permitted, which deviations can be characterized in terms of an angle that is permitted between the major planes of segments 2 and 4 (that respectively provide outward and inward walls of the frame portion). Such deviations can also be characterized in terms of an angle that is permitted between the major planes of segments 3 and 5 (that respectively provide a rear wall, and one layer of a front wall, of the frame portion).

Figure 12:
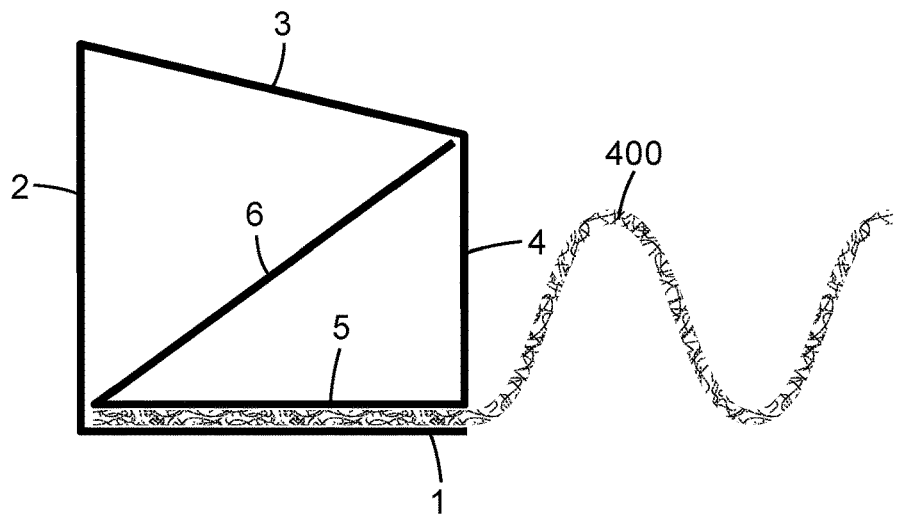
FIG. 12 is a cross-sectional view of another exemplary filter frame portion.
Figure 13:
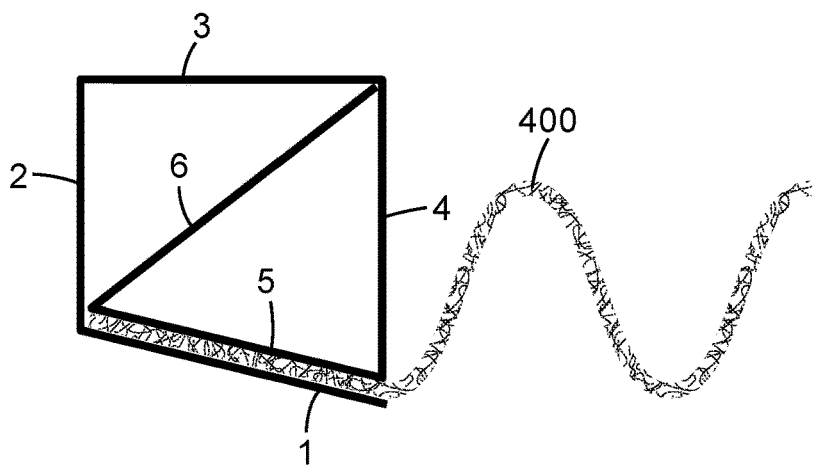
FIG. 13 is a cross-sectional view of another exemplary filter frame portion.
Figure 14:
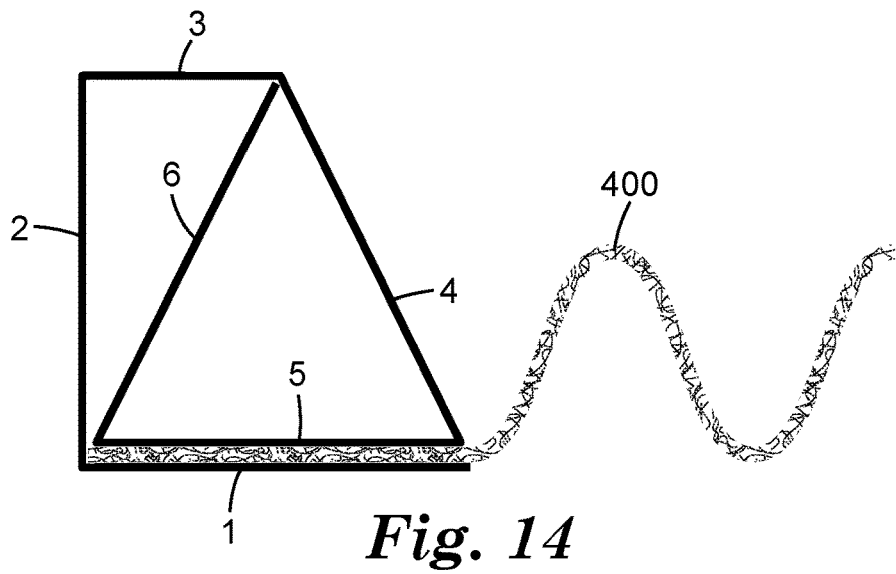
FIG. 14 is a cross-sectional view of another exemplary filter frame portion.
Figure 15:
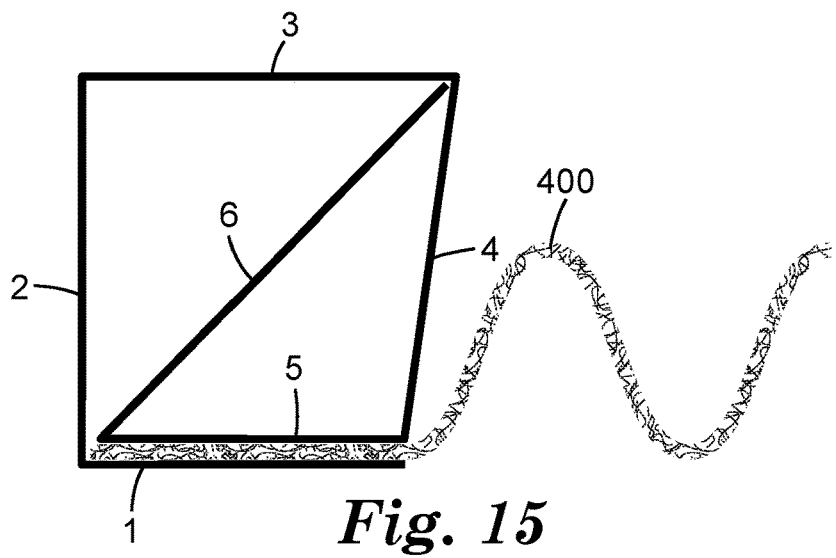
FIG. 15 is a cross-sectional view of another exemplary filter frame portion.

Thus in various embodiments, a major plane of second segment 2 may be oriented within plus or minus 40, 20, 10, or 5 degrees of a major plane of fourth segment 4. (An exemplary illustration in which a second segment 2 is oriented at an angle of approximately 20-30 degrees from a fourth segment 4 is shown in FIG. 14; an exemplary illustration with an angle of approximately 10-15 degrees is shown in FIG. 15). In various embodiments, a major plane of third segment 3 may be oriented within plus or minus 40, 20, 10, or 5 degrees of a major plane of fifth segment 5. (Exemplary illustrations in which a third segment 3 is oriented at an angle of approximately 10-15 degrees from a fifth segment 5 are shown in FIGS. 12 and 13). In some embodiments second segment 2 may be oriented within plus or minus 5 degrees of fourth segment 4 and third segment 3 may be oriented within plus or minus 5 degrees of fifth segment 5. In specific embodiments (e.g. as in FIG. 3), segments 2 and 4 may be essentially parallel to each other and segments 3 and 5 may be essentially parallel to each other (with the resulting frame portion thus being essentially rectangular in shape).

In at least some embodiments, when a frame piece is spiral-wrapped to form a frame portion, two segments (e.g., segments 1 and 5 of FIG. 3) of the frame piece will be in overlapping relation (i.e., in at least partial overlapping relation) with each other as shown in FIG. 3. An edge portion of the filter media 400 may be sandwiched between the two segments. The two segments (along with the edge portion of the filter media) can thus combine to form a multilayer front wall 15 of the frame portion (although, depending on the stiffness of the filter media, the media itself may not necessarily contribute significantly to the wall strength).

As noted, a frame piece (e.g. piece 121 of FIG. 6) will be folded (i.e., spiral-wrapped) to form a frame portion (e.g. portion 111 of FIG. 3). The individual segments (e.g., first segment 1, second segment 2, etc.) of frame piece 121 will each provide a wall (or a layer of a multilayer wall, for the front wall) of frame portion 111, excepting the sixth, terminal segment, which will provide a reinforcing strut. In like manner, similar segments of the three other frame pieces will be likewise spiral-wrapped to form the three other portions of the frame. For example, segments 1-6 of frame piece 122 of FIG. 6 will be spiral-wrapped to form the various walls of frame portion 112 of FIGS. 2 and 3. (This being the case, in FIG. 6 the various segments of frame piece 122 are given the same numbering as the corresponding segments of frame piece 121.)

One advantage of a spiral-wrapped frame is that in some embodiments only the spirally-outward major surface (surface 7 as identified in FIGS. 3 and 6) need be a decorative surface. That is, since major surface 8 will be a spirally-inward surface that may not be visible in ordinary use of the framed air filter, it need have no particular decorative treatment (e.g. painting or application of a decorative tape or laminate). Spirally-outward surface 7, on the other hand, can be painted, can have a decorative laminate applied thereto, can be provided with various indicia (e.g., indicating the orientation in which the framed air filter is to be installed in an air-handling system), etc., as desired.

Once a frame piece is spiral-wrapped to form a frame portion, it can be maintained in that spiral-wrapped configuration in any suitable manner. Conveniently, various segments of the frame portion can be fastened to each other, whether by one or more adhesives, and/or by mechanical fasteners such as staples, grommets and so on. Such adhesives may be chosen from e.g. pressure-sensitive adhesives, hot-melt adhesives, photocurable adhesives, wood glues, rubber cements, and so on. The adhesive may be chosen in view of the particular material that the frame is made of (e.g. plastic, metal, and so on). Since filter frames are often made of paperboard, chipboard, and the like, it may be convenient to use an adhesive that is well-suited for bonding of cellulosic materials.

With reference to FIG. 3, in particular embodiments at least an area 9 of the spirally-inward major surface 8 of first frame piece segment 1 may comprise an adhesive 11 disposed thereon; and/or, at least an area 10 of the spirally-outward major surface 7 of fifth frame piece segment 5 may comprise an adhesive 19 disposed thereon. At least these areas of segments 1 and 5 may be in overlapping relation with each other, and may be bonded to each other, to maintain the frame portion in its spiral-wrapped configuration. Moreover, if desired an edge portion of filter media 400 may be sandwiched between adhesive-bearing areas 9 and 10 of segments 1 and 5 so as to adhesively bond the edge portion of the filter media in place between the first and fifth frame piece segments, as shown in exemplary embodiment in FIG. 3. The terminal edge of the filter media 400 may extend e.g. so that it resides near the junction of segment 1 with segment 2; or, the terminal edge may be positioned laterally inward from this junction so that the filter media only extends partially along the space between segments 1 and 5, as in the exemplary embodiment of FIG. 3. Such an approach can thus serve to attach the filter media to the frame portion as well as to hold the frame portion in its spiral-wrapped configuration. Such an adhesive or adhesives might be deposited e.g. continuously along most or essentially all of the elongate length of the frame portion; or, the adhesive might be deposited at discrete locations along the frame portion. (Also, depending e.g. on the porosity of the filter media and the ability of an adhesive to penetrate through the filter media, an adhesive might be provided on only one, or on both, of segments 1 and 5.)

As noted earlier, in some embodiments all four frame portions of a filter frame may be provided by a single frame part that comprises four frame pieces. FIGS. 1-6 illustrate exemplary approaches of this general type. In such approaches, the single frame part may be configured so that neighboring frame pieces that meet to form a corner of the frame are integrally connected to each other along first segments 1 of each frame piece, which first segments collectively provide a frontmost layer of a multilayer front wall of the frame. FIG. 6, which is a magnified view of a corner section of a single frame part 120 used to make the frame of FIG. 2, presents an exemplary design of this type. It will be appreciated from FIG. 6 that the first segments 1 of frame pieces 121 and 122 meet at area 16 which provides an integral connection between frame pieces 121 and 122 and thus between the frame portions formed therefrom.

A frame 110 will define an active filtration area (i.e., an area in which a filter media will be present in the finished framed air filter) 401, which active filtration area may be empty space that is laterally outwardly bounded by the four frame portions, as in FIGS. 2 and 4. In other embodiments (as depicted in exemplary manner in FIG. 5), one or more support members 127 may be provided that are integrally connected to first segments 1 of at least some pieces of the frame and that cross at least part of the active filtration area 401. Such support members, since they extend from the first segments 1 of the frame pieces (that is, from the frontmost portion of the finished frame) will be positioned on the "front" side of the framed filter as defined herein. However, it is emphasized that the "front" side of the herein-disclosed framed filters may be positioned upstream or downstream in an airstream. Thus, if support members 127 are present, they may be provided on a downstream side of the filter media so that they can support the media against the pressure of airflow. However, such support members may support the filter media from the front side, e.g. if the filter media is attached, e.g. adhesively bonded, to the support members in at least some locations. Furthermore, the term support member broadly encompasses not only elongate members of the general type shown in FIG. 5, but also includes arrangements in which perforations (e.g. circular cutouts) are provided in a support member that takes the form of a perforate sheet that extends across the active filtration area.

In addition to, or instead of, any such support member(s) that extend integrally from a frame portion, the disclosed framed air filter may include one or more support members that are provided separately from the frame (and which may be e.g. attached to the frame during assembly of the air filter). Moreover, the filter media itself may (e.g. if pleated) comprise any suitable pleat-stabilizing items such as members, strips, filaments, or the like. Such pleat-stabilizing items might be e.g. bonded only to the pleat tips; or they may follow (at least partially) the pleats of the media and thus may be bonded to pleat walls and/or valleys as well. Pleat-stabilizing items of the former type might include e.g. paperboard strips, polymeric filaments, and so on. Pleat-stabilizing items of the latter type might include e.g. wire meshes or chicken-wire type metal grids (e.g. that are applied to the filter media and then pleated along therewith), beads of drizzle glue, and so on.

Figure 7:
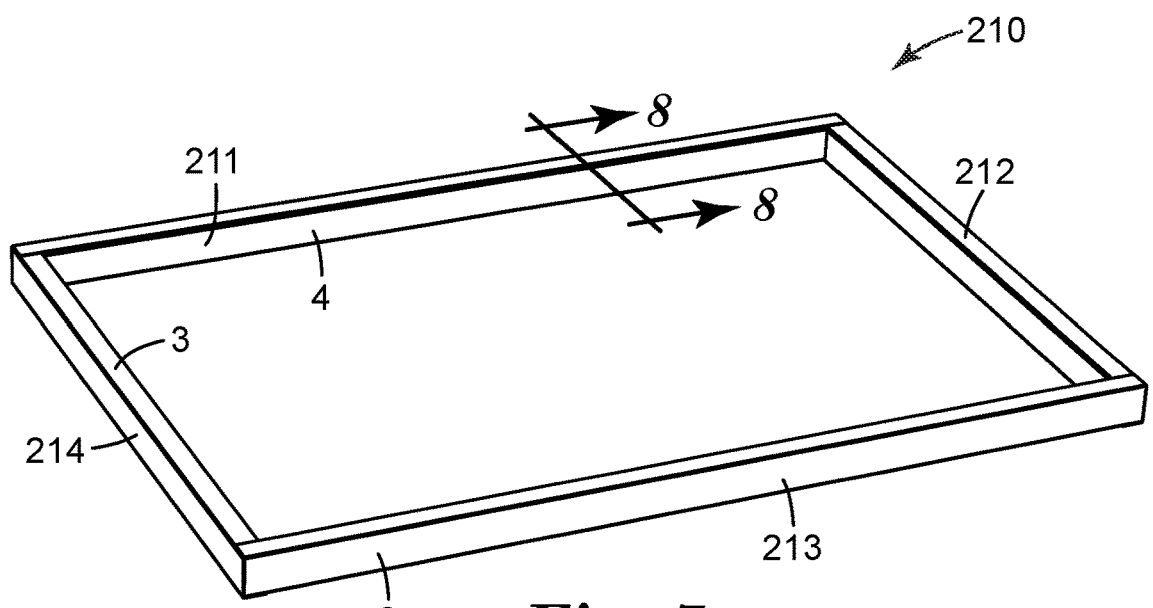
FIG. 7 is a perspective view of another exemplary filter frame.

In some embodiments, not all four frame portions of a frame need necessarily be provided by a single frame part in the manner of FIGS. 1-6. In alternative, multi-part designs, all four frame portions may each be individually and separately provided by single frame parts, with the four separate frame parts each including only one frame piece and with the four separate frame parts being connected/attached to each other when the frame is assembled. Or, three frame portions (e.g. forming three sides of a rectangle) may be provided by a first frame part that includes three frame pieces that are integrally connected to each other in succession, with the remaining frame portion being provided by a second, separate frame part that comprises a single frame piece, with the second frame part being connected/attached to the first frame part when the frame is assembled. Or, in an approach that is illustrated in exemplary manner in FIGS. 7-11, two frame portions may be provided by a first frame part, and two other frame portions may be provided by a second, separate frame part. That is, each of the two frame parts may, when spiral-wrapped, form an L-shaped entity that includes two, neighboring frame portions that are integrally connected to each other at a corner, with the two L-shaped entities being attached to each other at terminal ends thereof so as to form a rectangular frame (e.g. to form frame 210 as shown in FIG. 7, comprising four frame portions 211, 212, 213 and 214).

Figure 8:
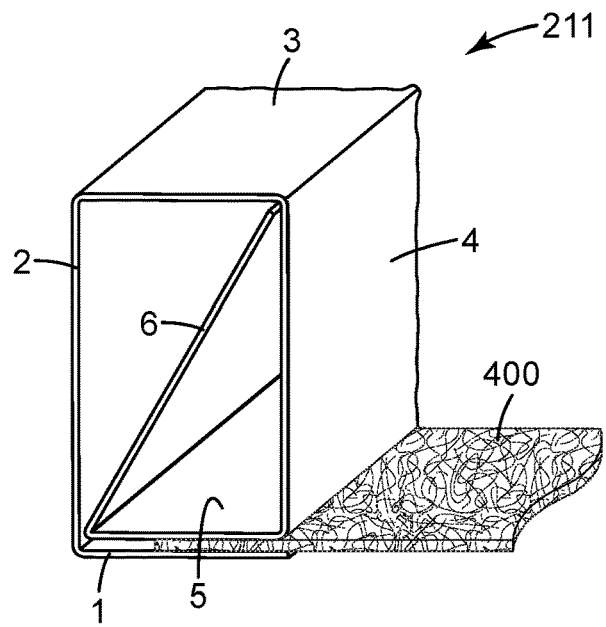
FIG. 8 is a cross-sectional view of a portion of the frame of FIG. 7, taken along line 8-8.
Figure 10:
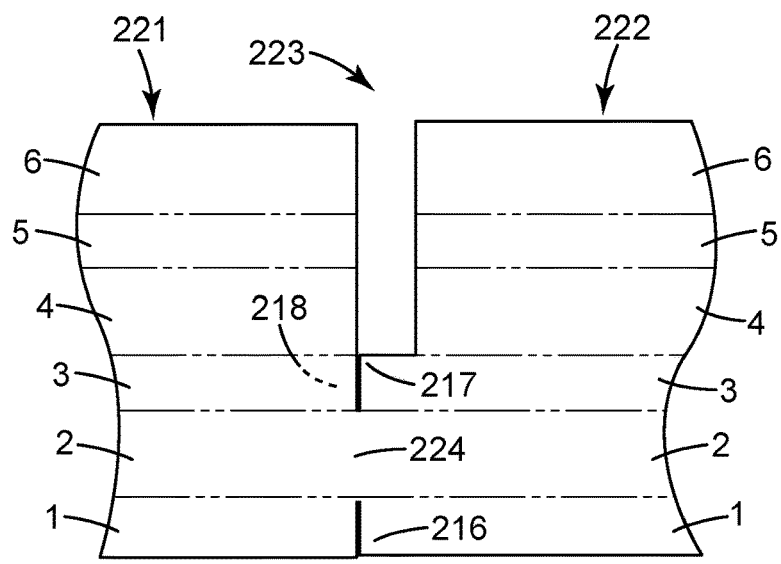
FIG. 10 is a magnified plan view of a portion of the exemplary frame part of FIG. 9.
Figure 11:
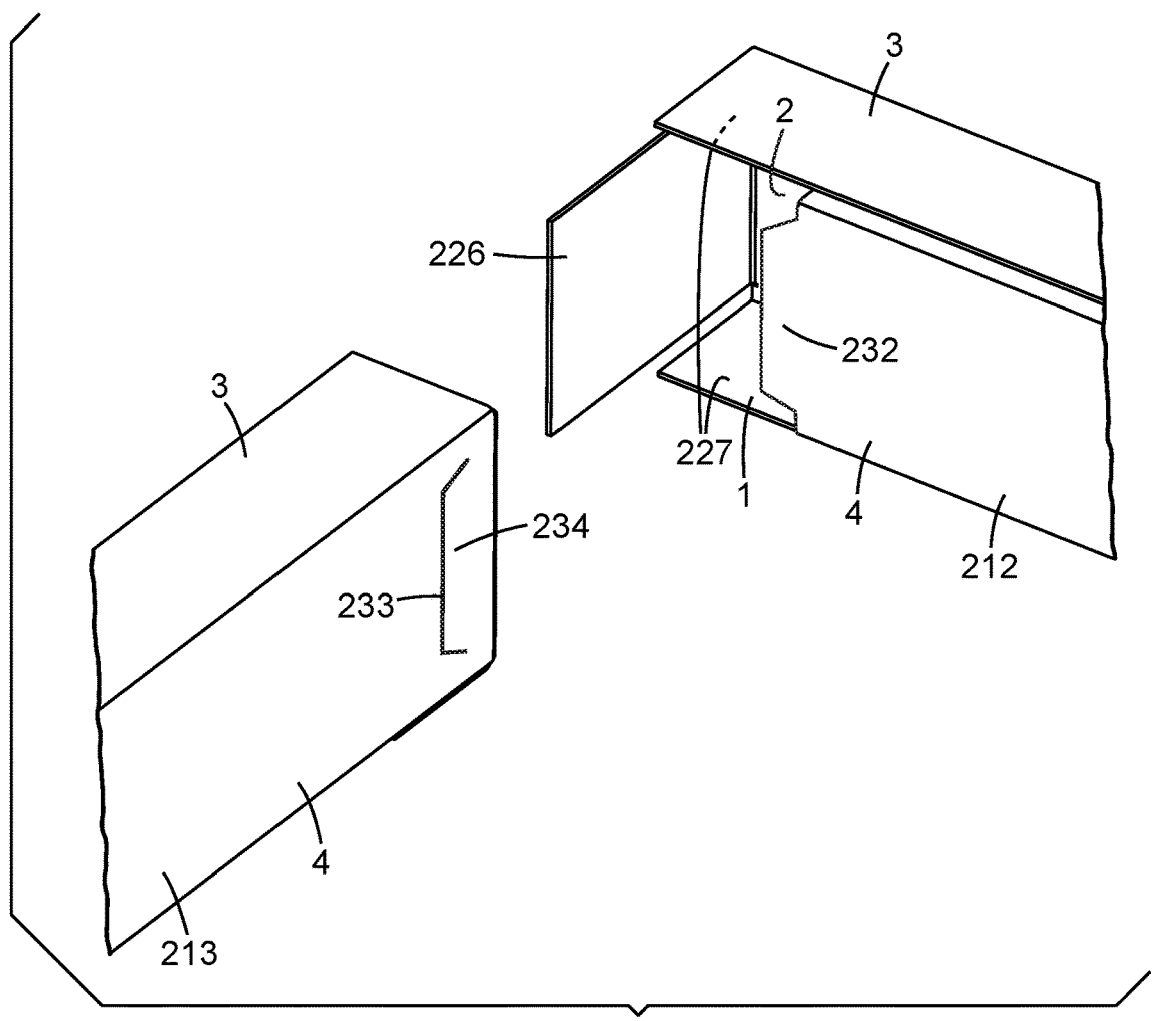
FIG. 11 is a perspective view of two neighboring frame portions of an exemplary frame, exploded apart from each other.

A frame part 223 of this general type is shown in FIG. 9 with an integral-corner-forming portion thereof shown in magnified view in FIG. 10. Frame part 223 includes first and second frame pieces 221 and 222 that are integrally connected to each other at hinged, integral connection 224 (hinged connection 224 can be provided e.g. by a fold line akin to those described earlier herein, except oriented perpendicular to the long axis of the frame pieces rather than being aligned therewith). Frame pieces 221 and 222 can provide two neighboring frame portions (e.g., portions 211 and 212 of frame 210 of FIG. 7) of a frame, which portions will be integrally connected to each other at a corner of the frame. A cross-sectional view of a frame portion 211 formed by spiral-wrapping one such frame piece (e.g., piece 221) is shown in FIG. 8. It will be appreciated that segments 1-6 of such a frame piece function in similar manner to the above-described segments 1-6 of the frame pieces of the frame part 120 described earlier. One difference between these two general approaches is that in a finished frame of the multi-part design, neighboring frame portions may be integrally connected to each other by way of their second segments 2 (that provide outer walls of the frame portions) rather than being integrally connected with each other by way of their first segments 1 (which provide a layer of the front walls of the frame portions) as in single-part designs. Also, in the design of FIG. 10, when pieces 221 and 222 are spiral-wrapped and brought together along hinged connection 224 (to form an L-shaped entity) the portion of first segment 1 of frame piece 222 labeled 216 will overlap (or underlap), along the front-rear axis of the frame, the corresponding portion of first segment 1 of frame piece 221.

Also, in a multi-part frame not all of the corners of the finished frame are integral corners. For example, in embodiments of the general type shown in FIGS. 7-9, two frame parts are used, each frame part (when folded and spiral-wrapped) forming an L-shaped entity that provides two frame portions that are neighboring frame portions that meet to form a corner of the frame and that are integrally connected to each other along second segments of each frame portion. First and second, diagonally-opposing corners of the frame are thus integral corners. The first and second L-shaped frame parts will be assembled together so that third and fourth corners of the frame (that are also diagonally-opposing corners) will be non-integral corners respectively formed by joining a first terminal end of the first frame part to a second terminal end of the second frame part and by joining a second terminal end of the first frame part to a first terminal end of the second frame part. Ways in which such terminal ends may be joined to each other are discussed in detail later herein.

It will also be noticed that frame portion 211 (of frame 210) as depicted in FIG. 8 differs in aspect ratio from frame portion 111 as depicted in FIG. 3. That is, frame portion 211 of FIG. 8 illustrates a design in which the laterally inward-outward dimension of a frame portion is reduced in comparison to the front-rear dimension of the frame portion. This illustrates another advantage that can provided by a spiral-wrapped configuration using a reinforcing strut. Specifically, the lateral inward-outward dimensions of one or more of the frame portions (typically, of all four frame portions) can be reduced while still maintaining excellent structural rigidity, owing to the presence of the reinforcing strut. Thus, for a framed filter of the same overall size (that is, of the same total footprint), the lateral extent of the frame can be reduced to free up more active filtration area. Still another potential advantage of a spiral-wrapped filter frame (irrespective of the aspect ratio) is that one or more finger tabs may be provided so that a finger can be inserted to remove the filter from an air-handling system. It will be appreciated that such tabs can be provided e.g. by partially perforating an outer wall of a portion of the filter frame without causing any air leaks (since the inner wall of that frame portion will provide a barrier to any such leaks).

The above disclosures have focused primarily on the spiral-wrapped nature of each frame portion. These disclosures apply to any frame portion regardless of the manner in which the frame portion meets and joins a neighboring frame portion at a corner of the frame. A corner junction between neighboring frame portions can be integral, or can be non-integral, as noted above. All of the corner junctions of a frame may be integral junctions (as in the design of FIGS. 2-6). Or, all of the corner junctions may be non-integral (that is, four separate frame parts/pieces may be joined at the corners to form a frame). Or, some (e.g. two) of the corner junctions may be integral and some (e.g. two) may be non-integral (as in the design of FIGS. 7-10).

In some embodiments, it may be useful to provide a corner tab at a terminal end of a second segment of a frame piece. Such tabs are shown in exemplary embodiment as tab 126 of FIG. 6 and tab 226 of FIGS. 9 and 11. Such tabs may be particularly useful in frame corners in which second segments of neighboring frame portions are not integrally connected to each other (that is, they may be useful in corners other than those formed by hinged joint 224 as shown in FIG. 9). Such a tab can be folded (e.g. along a fold line similar to those described earlier) so that it extends along the long axis of the neighboring frame portion to which the tab-comprising frame portion is to be joined. The tab can then be e.g. tucked into interior space 13 of the neighboring frame portion (and may or may not be attached, e.g. adhesively bonded, to a segment of that neighboring frame portion). Alternatively, the tab can be positioned laterally outward of the segment of the neighboring frame portion and attached thereto. Either of these approaches might help to e.g. improve the structural rigidity of the corner, reduce air leaks through the corner, and so on.

It is emphasized that the use of any component (such as e.g. a tab) that extends from a terminal end of a first frame portion and is e.g. inserted into an interior space of a neighboring frame portion (or is positioned laterally outward of the neighboring frame portion), does not violate the condition that the neighboring frame portion is formed from a single frame piece. That is, a component that extends only along a short extent of the elongate length of a frame portion, and serves merely to enhance the properties of a corner of the frame, is not considered to be a separate frame piece that is spiral-wrapped along with the frame piece that forms the neighboring frame portion.

Another potential advantage of spiral-wrapped frame pieces is that when two frame portions are assembled together at a corner (whether from separate frame parts or from different frame pieces of a single frame part), in some embodiments the terminal minor ends of segments of a first neighboring frame portion can be abutted against (that is, brought into direct contact with) the laterally inward surface of the second segment of the second neighboring frame portion. This is most easily visualized in the embodiment of FIG. 11, which shows an exploded view of a first frame portion 212 (from a first frame part) as assembled together with a neighboring frame portion 213 (from a second frame part) so as to form a non-integral joint. In such a design, at least some part(s) of terminal minor ends of at least one, two, three, four, five, or all six of the first, second, third, fourth, fifth and sixth segments of second frame portion 213 may be abutted against, and in contact with, the laterally inward surface of second segment 2 of the frame portion 212. In some embodiments, essentially all parts of the terminal minor ends of all six of the segments are so abutted. It will be appreciated that such arrangements can further increase the structural rigidity of the thus-formed corner. Although these arrangements were discussed in the particular context of a non-integral corner formed by joining two separate frame parts to each other, it will be appreciated that these arrangements can also be achieved in integral corners.

In at least some embodiments one or more adhesives may be used at frame corners. (This may be done e.g. in addition to using an adhesive to bond the first and fifth segments together, e.g. with an edge of the filter media sandwiched therebetween, along some or all of the elongate length of a frame portion as disclosed earlier herein.) For example, with reference to FIG. 6, an adhesive can be provided in area 17 of spirally-inward surface 8 third segment 3 of frame piece 122. Upon this frame piece and neighboring frame piece 121 being spiral-wound (to respectively form neighboring frame portions 112 and 111), this adhesive can then be bonded to area 18 of spirally-outward surface 7 of third segment 3 of neighboring frame piece 121. (Adhesive could also be provided on area 18 of frame piece 121, in addition to, or instead of, providing adhesive on area 17 of frame piece 122.) And, of course, areas 17 and 18 could be mechanically attached to each other (e.g. via staples) rather than by use of an adhesive. Similarly, with reference to FIG. 10, an adhesive can be provided in area 217 of spirally-inward surface 8 of third segment 3 of frame piece 222, so as to bond this area to a bonding area 218 of the spirally-outward surface of third segment 3 of neighboring piece 221. Still further, with reference to FIG. 11, an adhesive can be provided on spirally-inward area(s) 227 of first and third segments of frame portion 212 and/or on a spirally-inward surface of tab 226. Instead of, or in addition to this, an adhesive can be provided on a spirally-outward surface of end areas of any or all of the first, second, third, or fourth segments of frame portion 213 to similar effect.

The herein-described frame pieces (whether provided as pieces of a single frame part, or in the guise of two or more frame parts) may be spiral-wrapped and assembled, along with filter media, to form a framed air filter using any suitable method, whether relying on manual assembly, robotic assembly, or a mixture of the two. Any of the aforementioned adhesives may be used in any location desired. In particular embodiments, such adhesives may be e.g. hot melt adhesives that are applied to desired surfaces of frame pieces, the various frame pieces then being spiral-wound and brought together so that the adhesive-bearing surface(s) are brought together with mating surfaces as desired, and the adhesive allowed to cool and harden. In some embodiments, a frame piece may be at least partially spiral-wrapped before an adhesive is applied to it. In some embodiments, an adhesive may be applied to a surface of a frame piece and then allowed to cool and harden, after which the frame piece is spiral-wrapped and assembled to a neighboring frame piece. Then, while the frame piece(s) is held in the spiral-wrapped configuration, at least an adhesive-bearing portion of the frame piece(s) may be heated so as to activate (e.g., to at least partially remelt) the adhesive, then cooled to harden the adhesive.

In some embodiments, it may be beneficial for two neighboring frame pieces that form a corner of the finished frame (whether or not the neighboring frame pieces are provided by a single frame part or are provided by separate frame parts), to include features whereby the fourth segments 4 (that provide the inward walls of the spiral-wrapped frame portions) can mechanically interact with one another. This may serve to enhance the rigidity of the frame corner of the final, finished frame. In addition to this, or instead of this, such an arrangement can provide that the two frame portions can mechanically interact with each other in a self-stabilizing manner so as to collectively reduce the tendency of each frame portion to unfold from a spiral-wrapped configuration. This may provide that the corner (e.g., the entire frame) may be at least somewhat self-stabilizing in the spiral-wrapped configuration e.g. while waiting for an adhesive to fully harden.

Thus, in some embodiments (and as shown in exemplary manner in FIG. 11), a first frame portion (portion 212, in FIG. 11) may comprise a fourth segment 4 that provides an inner wall of the first frame portion, which fourth segment 4 comprises a locking tab 232 that extends from a terminal minor end of the fourth segment 4, wherein a second, neighboring frame portion (portion 213, in FIG. 11) comprises a fourth segment 4 that provides an inner wall of the second, neighboring frame portion, which fourth segment 4 of the second, neighboring frame portion comprises a receiving slot 233 that is configured to receive at least a portion of the locking tab 232 of the first frame portion. Thus, when the two frame portions are spiral-wrapped and mated to form a corner, the interaction of the locking tab and the receiving slot may physically interfere with any tendency of the two frame portions to unwrap. In particular embodiments, receiving slot 233 may have an at least slightly arcuate or chamfered shape so as to be bordered by a tongue 234 (of the solid material of the fourth segment of portion 213), which tongue will be at least slightly deflectable in a laterally outward direction so as to easily allow entry of locking tab 232 into receiving slot 233. In further embodiments, locking tab 232 may be tapered or otherwise shaped so as to more easily allow entry of locking tab 232 into receiving slot 233. Arrangements such as this may be provided at e.g. one, two, three, or all four corners of the frame, irrespective of whether such corners are integral corners or non-integral corners or whether the frame is a single-part frame or a multi-part frame.

It is emphasized that any suitable corner arrangements, designs, configurations, bonding/attachment methods, etc., may be used in combination with a spiral-wrapped frame portion. That is, the use of a spiral-wrapped frame portion is not limited to any particular design or method of bonding of a frame corner. The corner arrangements may be modified in view of particular circumstances, e.g. if a frame portion design of the general type shown in any of FIGS. 12-15 is used.

It will be appreciated that the framed filters disclosed herein, relying on frame portions that are each spiral-wrapped from a single frame piece so as to include a reinforcing strut as defined and described herein, will be distinguished from conventional "pinch" frames and from conventional U-shaped "channel" frames. In particular, the herein-disclosed framed filters are distinguished from those described e.g. in U.S. Pat. No. 6,126,707 to Pitzen, which filters appear to comprise frame portions that are either made from more than one frame piece and/or are not spiral-wrapped so as to include a reinforcing strut.

As noted, any suitable filter media 400 may be used in the disclosed framed filter. In various embodiments filter media 400 may be unpleated (e.g., it may be generally or essentially flat) as in the exemplary embodiment of FIG. 8; or, filter media 400 may be pleated as in the exemplary embodiment of FIG. 1. If media 400 is pleated, in some embodiments media 400 may be oriented so that the pleated media resides at least generally, or essentially, within the volume defined by the front and rear faces of the frame, as in the exemplary designs of FIGS. 12-15. (Such a design may be contrasted to a design in which e.g. at least portions of the pleats protrude forwardly beyond the front face of the frame.)

List of Exemplary Embodiments

Embodiment 1 is a framed air filter, comprising: an air filter media comprising a generally rectangular perimeter with four major edges; and, a frame comprising four frame portions, each frame portion being mounted on one of the four major edges of the air filter media and with neighboring frame portions meeting to form corners of the frame, wherein each frame portion is provided by single frame piece that comprises multiple segments that are foldably connected by fold lines, which single frame piece is spiral-wrapped in a generally rectangular configuration with two segments of the single frame piece in overlapping relation with each other with an edge portion of the filter media sandwiched therebetween so as to provide a multilayer front wall of the frame portion; and, wherein a terminal segment of the single frame piece extends from an outward-front vertex of the frame portion and terminates at an inward-rear vertex of the frame portion and provides a reinforcing strut that extends at least generally diagonally across an at least generally rectangular interior space defined by inward, outward, front and rear walls of the frame portion.

Embodiment 2 is the framed air filter of embodiment 1, wherein: first and fifth segments of the frame piece are in overlapping relation with each other, with an edge portion of the filter media sandwiched therebetween, so as to provide the multilayer front wall of the frame portion, second and fourth segments of the frame piece respectively provide outward and inward walls of the frame portion, a third segment of the sidewall provides a rear wall of the frame portion, and, a sixth, terminal segment of the frame piece extends from an outward-front vertex of the first and second frame piece segments and terminates at an inward-rear vertex of the third and fourth frame piece segments and provides a reinforcing strut that extends at least generally diagonally across an at least generally rectangular interior space defined by the second, third, fourth, fifth segments of the frame piece.

Embodiment 3 is the framed air filter of embodiment 2 wherein the first and second segments of the frame piece are foldably connected to each other along a fold line of the frame piece, the second and third segments of the frame piece are foldably connected to each other along a separate fold line of the frame piece, the third and fourth segments of the frame piece are foldably connected to each other along another separate fold line of the frame piece, the fourth and fifth segments of the frame piece are foldably connected to each other along another separate fold line of the frame piece, and the fifth and sixth segments of the frame piece are foldably connected to each other along another separate fold line of the frame piece.

Embodiment 4 is the framed air filter of any of embodiments 2-3 wherein the segments are spiral-wrapped so that the walls provided by the second, third, and fourth segments of the frame piece, and the multilayer wall provided by the combination of the first and fifth segments of the frame piece, combine to enclose an at least generally rectangular interior space within which the sixth, terminal segment is located and which the sixth, terminal segment divides into two at least generally triangular sub-spaces.

Embodiment 5 is the framed air filter of any of embodiments 2-4 wherein the second and fourth segments of the frame piece each exhibit a major plane and wherein the major plane of the second segment is oriented within plus or minus 40 degrees of the major plane of the fourth segment. Embodiment 6 is the framed air filter of any of embodiments 2-4 wherein the second and fourth segments of the frame piece each exhibit a major plane and wherein the major plane of the second segment is oriented within plus or minus 20 degrees of the major plane of the fourth segment. Embodiment 7 is the framed air filter of any of embodiments 2-4 wherein the second and fourth segments of the frame piece each exhibit a major plane and wherein the major plane of the second segment is oriented within plus or minus 10 degrees of the major plane of the fourth segment.

Embodiment 8 is the framed air filter of any of embodiments 2-7 wherein the first and third segments of the frame piece each exhibit a major plane and wherein the major plane of the first segment is oriented within plus or minus 40 degrees of the major plane of the third segment. Embodiment 9 is the framed air filter of any of embodiments 2-7 wherein the first and third segments of the frame piece each exhibit a major plane and wherein the major plane of the first segment is oriented within plus or minus 20 degrees of the major plane of the third segment. Embodiment 10 is the framed air filter of any of embodiments 2-7 wherein the first and third segments of the frame piece each exhibit a major plane and wherein the major plane of the first segment is oriented within plus or minus 10 degrees of the major plane of the third segment.

Embodiment 11 is the framed air filter of any of embodiments 2-10: wherein the single frame piece comprises a spirally-inward major face and a spirally-outward major face, wherein at least a portion of a spirally-inward major face of the first frame piece segment comprises an adhesive disposed thereon and wherein at least a portion of a spirally-outward major face of the fifth frame piece segment comprises an adhesive disposed thereon, and wherein at least a part of the adhesive-bearing portion of the spirally-inward major face of the first frame piece segment is in overlapping relation with at least a part of the adhesive-bearing portion of the spirally-outward major face of the fifth frame piece segment with the edge portion of the filter media sandwiched therebetween so as to adhesively bond the edge portion of the filter media in place between the first and fifth frame piece segments.

Embodiment 12 is the framed air filter of any of embodiments 2-11 wherein the first frame piece segment exhibits a length along an inward-outward lateral direction of the frame portion, that is from about 95% to about 110% of a length of the fifth frame piece segment along the inward-outward lateral direction of the frame portion. Embodiment 13 is the framed air filter of any of embodiments 2-11 wherein the first frame piece segment exhibits a length along an inward-outward lateral direction of the frame portion, that is from about 35% to about 65% of a length of the second frame piece segment along a front-rear direction of the frame portion.

Embodiment 14 is the framed air filter of any of embodiments 2-13 wherein the frame comprising four frame portions is provided by a single frame part that includes four frame pieces, each of which frame pieces provides one of the four frame portions, and wherein the single frame part is configured so that neighboring frame portions that meet to form corners of the frame are integrally connected to each other along first segments of each frame piece, which first segments collectively provide a frontmost layer of a multilayer front wall of the frame. Embodiment 15 is the framed air filter of embodiment 14 wherein the single frame part further includes one or more support members that are integrally connected to first segments of at least some frame pieces and that cross at least part of an active filtration area of the framed air filter, which active filtration area is laterally bounded by the four frame portions.

Embodiment 16 is the framed air filter of any of embodiments 2-15 wherein at least one frame piece comprises a tab that extends integrally from the second segment of the frame piece and is hingedly connected thereto by a hinged connection that defines an outward wall of the frame at a corner between the frame portion provided by that frame piece and a neighboring frame portion provided by a neighboring frame piece.

Embodiment 17 is the framed air filter of any of embodiments 2-13 wherein the frame comprising four frame portions is collectively provided by first and second frame parts, each frame part including two frame pieces that each provide one of the four frame portions; wherein the two frame pieces of the first frame part are neighboring frame pieces that provide neighboring frame portions that meet to form a first, integral corner of the frame and that are integrally connected to each other along second segments of the two frame pieces of the first frame part, which second segments provide outer walls of the neighboring frame portions of the first frame part; and wherein the two frame pieces of the second frame part are neighboring frame pieces that provide neighboring frame portions that meet to form a second, integral corner of the frame and that are integrally connected to each other along second segments of the two frame pieces of the second frame part, which second segments provide outer walls of the neighboring frame portions of the second frame part; and, wherein first and second, integral corners of the frame are diagonally-opposing corners and wherein third and fourth, diagonally-opposing corners of the frame are non-integral corners respectively formed by joining a first terminal end of the first frame part to a second terminal end of the second frame part and by joining a second terminal end of the first frame part to a first terminal end of the second frame part.

Embodiment 18 is the framed air filter of embodiment 17 wherein at the third, non-integral corner of the frame, the first frame part comprises a tab that extends integrally from the second segment of the first frame part and is foldably connected thereto, which tab comprises a major surface that is adhesively bonded to a major surface of an end area of a second segment of the second frame part; and, wherein at the fourth, non-integral corner of the frame, the second frame part comprises a tab that extends integrally from the second segment of the second frame part and is foldably connected thereto, which tab comprises a major surface that is adhesively bonded to a major surface of an end area of a second segment of the first frame part.

Embodiment 19 is the framed air filter of any of embodiments 2-18 wherein a first frame portion is provided by a first frame piece that comprises a fourth segment that provides an inner wall of the first frame portion, which fourth segment comprises a locking tab that extends from a terminal minor end of the fourth segment; and, wherein a second, neighboring frame portion is provided by a frame piece that comprises a fourth segment that provides an inner wall of the second, neighboring frame portion, which fourth segment of the second, neighboring frame portion comprises a receiving slot that is configured to receive at least a portion of the locking tab of the first frame portion. Embodiment 20 is the framed air filter of any of embodiments 2-19 wherein at least at one corner of the frame, terminal minor ends of at least any the three of the first, second, third, fourth, fifth and sixth segments of a frame piece that provides one frame portion are abutted against, and are in contact with, a laterally-inward surface of a second segment of a of a frame piece that provides a neighboring frame portion.

Embodiment 21 is the framed air filter of any of embodiments 2-20 wherein the framed air filter comprises indicia indicating that a front side of the framed air filter, which front side comprises a multilayer front wall of the frame, is an upstream side of the framed air filter as the framed air filter is installed into an air-handling system. Embodiment 22 is the framed air filter of any of embodiments 2-20 wherein the framed air filter comprises indicia indicating that a front side of the framed air filter, which front side comprises a multilayer front wall of the frame, is a downstream side of the framed air filter as the framed air filter is installed into an air-handling system.

Embodiment 23 is a method of making a framed filter, the method comprising: spiral-wrapping four single frame pieces onto four respective major edges of an at least generally rectangular air filter media to respectively form four frame portions, wherein each single frame piece is spiral-wrapped into a generally rectangular configuration with two segments of the single frame piece in overlapping relation with each other with an edge portion of the filter media sandwiched therebetween so as to provide a multilayer front wall of the frame portion; and, wherein a terminal segment of the single frame piece extends from an outward-front vertex of the frame portion and terminates at an inward-rear vertex of the frame portion and provides a reinforcing strut that extends at least generally diagonally across an at least generally rectangular interior space defined by inward, outward, front and rear walls of the frame portion.

It will be apparent to those skilled in the art that the specific exemplary elements, structures, features, details, configurations, etc. that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

What is claimed is:

1. A framed air filter, comprising:
an air filter media comprising a generally rectangular perimeter with four major edges;
and,
a frame comprising four frame portions, each frame portion being mounted on one of the four major edges of the air filter media and with neighboring frame portions meeting to form corners of the frame,
wherein each frame portion is provided by single frame piece that comprises multiple segments that are foldably connected by fold lines, which single frame piece is spiral-wrapped in a generally rectangular configuration with two segments of the single frame piece in overlapping relation with each other with an edge portion of the filter media sandwiched therebetween so as to provide a multilayer front wall of the frame portion; and, wherein a terminal segment of the single frame piece extends from an outward-front vertex of the frame portion and terminates at an inward-rear vertex of the frame portion and provides a reinforcing strut that extends at least generally diagonally across an at least generally rectangular interior space defined by inward, outward, front and rear walls of the frame portion.

2. The framed air filter of claim 1, wherein:
first and fifth segments of the frame piece are in overlapping relation with each other, with an edge portion of the filter media sandwiched therebetween, so as to provide the multilayer front wall of the frame portion,
second and fourth segments of the frame piece respectively provide outward and inward walls of the frame portion,
a third segment of the sidewall provides a rear wall of the frame portion, and,
a sixth, terminal segment of the frame piece extends from an outward-front vertex of the first and second frame piece segments and terminates at an inward-rear vertex of the third and fourth frame piece segments and provides a reinforcing strut that extends at least generally diagonally across an at least generally rectangular interior space defined by the second, third, fourth, fifth segments of the frame piece.

3. The framed air filter of claim 2 wherein the first and second segments of the frame piece are foldably connected to each other along a fold line of the frame piece, the second and third segments of the frame piece are foldably connected to each other along a separate fold line of the frame piece, the third and fourth segments of the frame piece are foldably connected to each other along another separate fold line of the frame piece, the fourth and fifth segments of the frame piece are foldably connected to each other along another separate fold line of the frame piece, and the fifth and sixth segments of the frame piece are foldably connected to each other along another separate fold line of the frame piece.

4. The framed air filter of claim 2 wherein the segments are spiral-wrapped so that the walls provided by the second, third, and fourth segments of the frame piece, and the multilayer wall provided by the combination of the first and fifth segments of the frame piece, combine to enclose an at least generally rectangular interior space within which the sixth, terminal segment is located and which the sixth, terminal segment divides into two at least generally triangular sub-spaces.

5. The framed air filter of claim 2 wherein the second and fourth segments of the frame piece each exhibit a major plane and wherein the major plane of the second segment is oriented within plus or minus 20 degrees of the major plane of the fourth segment.

6. The framed air filter of claim 2 wherein the second and fourth segments of the frame piece each exhibit a major plane and wherein the major plane of the second segment is oriented within plus or minus 10 degrees of the major plane of the fourth segment.

7. The framed air filter of claim 2 wherein the first and third segments of the frame piece each exhibit a major plane and wherein the major plane of the first segment is oriented within plus or minus 20 degrees of the major plane of the third segment.

8. The framed air filter of claim 2 wherein the first and third segments of the frame piece each exhibit a major plane and wherein the major plane of the first segment is oriented within plus or minus 10 degrees of the major plane of the third segment.

9. The framed air filter of claim 2:
wherein the single frame piece comprises a spirally-inward major face and a spirally-outward major face,
wherein at least a portion of a spirally-inward major face of the first frame piece segment comprises an adhesive disposed thereon and wherein at least a portion of a spirally-outward major face of the fifth frame piece segment comprises an adhesive disposed thereon, and
wherein at least a part of the adhesive-bearing portion of the spirally-inward major face of the first frame piece segment is in overlapping relation with at least a part of the adhesive-bearing portion of the spirally-outward major face of the fifth frame piece segment with the edge portion of the filter media sandwiched therebetween so as to adhesively bond the edge portion of the filter media in place between the first and fifth frame piece segments.

10. The framed air filter of claim 2 wherein the first frame piece segment exhibits a length along an inward-outward lateral direction of the frame portion, that is from about 95% to about 110% of a length of the fifth frame piece segment along the inward-outward lateral direction of the frame portion.

11. The framed air filter of claim 2 wherein the first frame piece segment exhibits a length along an inward-outward lateral direction of the frame portion, that is from about 35% to about 65% of a length of the second frame piece segment along a front-rear direction of the frame portion.

12. The framed air filter of claim 2 wherein the frame comprising four frame portions is provided by a single frame part that includes four frame pieces, each of which frame pieces provides one of the four frame portions, and wherein the single frame part is configured so that neighboring frame portions that meet to form corners of the frame are integrally connected to each other along first segments of each frame piece, which first segments collectively provide a frontmost layer of a multilayer front wall of the frame.

13. The framed air filter of claim 12 wherein the single frame part further includes one or more support members that are integrally connected to first segments of at least some frame pieces and that cross at least part of an active filtration area of the framed air filter, which active filtration area is laterally bounded by the four frame portions.

14. The framed air filter of claim 2 wherein at least one frame piece comprises a tab that extends integrally from the second segment of the frame piece and is hingedly connected thereto by a hinged connection that defines an outward wall of the frame at a corner between the frame portion provided by that frame piece and a neighboring frame portion provided by a neighboring frame piece.

15. The framed air filter of claim 2 wherein the frame comprising four frame portions is collectively provided by first and second frame parts, each frame part including two frame pieces that each provide one of the four frame portions;
wherein the two frame pieces of the first frame part are neighboring frame pieces that provide neighboring frame portions that meet to form a first, integral corner of the frame and that are integrally connected to each other along second segments of the two frame pieces of the first frame part, which second segments provide outer walls of the neighboring frame portions of the first frame part; and
wherein the two frame pieces of the second frame part are neighboring frame pieces that provide neighboring frame portions that meet to form a second, integral corner of the frame and that are integrally connected to each other along second segments of the two frame pieces of the second frame part, which second segments provide outer walls of the neighboring frame portions of the second frame part;
and,
wherein first and second, integral corners of the frame are diagonally-opposing corners and wherein third and fourth, diagonally-opposing corners of the frame are non-integral corners respectively formed by joining a first terminal end of the first frame part to a second terminal end of the second frame part and by joining a second terminal end of the first frame part to a first terminal end of the second frame part.

16. The framed air filter of claim 15 wherein at the third, non-integral corner of the frame, the first frame part comprises a tab that extends integrally from the second segment of the first frame part and is foldably connected thereto, which tab comprises a major surface that is adhesively bonded to a major surface of an end area of a second segment of the second frame part; and,
wherein at the fourth, non-integral corner of the frame, the second frame part comprises a tab that extends integrally from the second segment of the second frame part and is foldably connected thereto, which tab comprises a major surface that is adhesively bonded to a major surface of an end area of a second segment of the first frame part.

17. The framed air filter of claim 2 wherein a first frame portion is provided by a first frame piece that comprises a fourth segment that provides an inner wall of the first frame portion, which fourth segment comprises a locking tab that extends from a terminal minor end of the fourth segment; and, wherein a second, neighboring frame portion is provided by a frame piece that comprises a fourth segment that provides an inner wall of the second, neighboring frame portion, which fourth segment of the second, neighboring frame portion comprises a receiving slot that is configured to receive at least a portion of the locking tab of the first frame portion.

18. The framed air filter of claim 2 wherein at least at one corner of the frame, terminal minor ends of at least any the three of the first, second, third, fourth, fifth and sixth segments of a frame piece that provides one frame portion are abutted against, and are in contact with, a laterally-inward surface of a second segment of a of a frame piece that provides a neighboring frame portion.

19. The framed air filter of claim 1 wherein the framed air filter comprises indicia indicating that a front side of the framed air filter, which front side comprises a multilayer front wall of the frame, is an upstream side of the framed air filter as the framed air filter is installed into an air-handling system.

20. The framed air filter of claim 1 wherein the framed air filter comprises indicia indicating that a front side of the framed air filter, which front side comprises a multilayer front wall of the frame, is a downstream side of the framed air filter as the framed air filter is installed into an air-handling system.

* * * * *